(12) United States Patent
Lindner et al.

(10) Patent No.: US 11,305,708 B2
(45) Date of Patent: Apr. 19, 2022

(54) ARRANGEMENT FOR FASTENING AN ELONGATED OBJECT IN A MOTOR VEHICLE

(71) Applicant: NEXANS, Paris (FR)

(72) Inventors: Gerhard Lindner, Plossberg (DE); Hermann Teicher, Kohlberg (DE)

(73) Assignee: NEXANS, Courbevoie (FR)

(*) Notice: Subject to any disclaimer, the term of this patent is extended or adjusted under 35 U.S.C. 154(b) by 117 days.

(21) Appl. No.: 14/880,328

(22) Filed: Oct. 12, 2015

(65) Prior Publication Data

US 2016/0121815 A1    May 5, 2016

(30) Foreign Application Priority Data

Oct. 30, 2014  (EP) .................................... 14306744

(51) Int. Cl.
*B60R 16/00* (2006.01)
*B60R 16/02* (2006.01)
*F16L 3/00* (2006.01)
*F16L 3/12* (2006.01)
*H02G 3/32* (2006.01)

(52) U.S. Cl.
CPC .......... *B60R 16/00* (2013.01); *B60R 16/0215* (2013.01); *F16L 3/00* (2013.01); *F16L 3/12* (2013.01); *H02G 3/32* (2013.01)

(58) Field of Classification Search
CPC ... F16L 3/137; F16L 3/233; F16L 3/24; F16L 3/1075; F16L 3/12; F16B 2/20; F16B 2/22; B60R 16/0215; H02G 3/32
USPC .......................... 248/74.3, 74.2, 73, 49, 74.1
See application file for complete search history.

(56) References Cited

U.S. PATENT DOCUMENTS

| | | | | |
|---|---|---|---|---|
| 2,144,876 A | * | 1/1939 | Garnett | A01K 97/10 224/922 |
| 3,113,754 A | * | 12/1963 | Jansson | F16L 3/12 248/74.3 |
| 3,357,665 A | * | 12/1967 | Hand | F16B 5/0685 248/74.1 |
| 4,518,138 A | * | 5/1985 | Stutenkemper | F16B 5/06 248/220.21 |
| 4,766,651 A | * | 8/1988 | Kobayashi | B60R 16/0215 24/16 PB |
| 5,016,843 A | * | 5/1991 | Ward | F16L 3/04 174/4 R |
| 5,042,114 A | * | 8/1991 | Parrish | F16L 3/233 24/16 PB |
| 5,234,189 A | * | 8/1993 | Myers | B60N 2/071 248/429 |

(Continued)

FOREIGN PATENT DOCUMENTS

DE    102008020894    12/2009

OTHER PUBLICATIONS

Search Report dated 2015.
European Office Action dated Sep. 19, 2017.

*Primary Examiner* — Muhammad Ijaz
*Assistant Examiner* — Taylor L Morris
(74) *Attorney, Agent, or Firm* — Sofer & Haroun, LLP

(57) ABSTRACT

An arrangement for fastening at least one elongated object (1) in a motor vehicle is suggested, where by means of a fastening means (4) the elongated object (1) is attached to at least one fixed point on the fastening element (2). The fastening element (2) is releasably connectable to the receiving element (3) and fixedly mounted at the fixed point.

3 Claims, 2 Drawing Sheets

(56) References Cited

U.S. PATENT DOCUMENTS

| | | | |
|---|---|---|---|
| 5,390,876 A | | 2/1995 | Hatano et al. |
| 5,494,245 A | * | 2/1996 | Suzuki ................. F16L 3/1075 24/487 |
| 5,564,672 A | | 10/1996 | Matson |
| 5,597,980 A | * | 1/1997 | Weber ................. H02G 3/0418 123/143 C |
| 5,775,653 A | * | 7/1998 | Horney ................. F16L 3/137 24/16 PB |
| 6,042,062 A | * | 3/2000 | Sugiyama ........... B60R 16/0215 174/72 A |
| 6,126,122 A | * | 10/2000 | Ismert ................. F16L 3/08 248/74.1 |
| 6,253,421 B1 | * | 7/2001 | Kraus ................. B65D 63/1063 24/16 PB |
| 6,682,026 B2 | * | 1/2004 | Nagayasu ............. F16L 3/12 248/73 |
| 6,903,275 B1 | * | 6/2005 | Jetton ................. B60R 16/0215 174/503 |
| 7,290,739 B2 | * | 11/2007 | Zeuner ................. H02G 3/30 248/229.11 |
| 7,294,789 B1 | * | 11/2007 | Watthanasintham ........................ B60R 16/0215 174/135 |
| 7,377,472 B2 | * | 5/2008 | Brown ................. F16L 3/10 248/74.1 |
| 7,621,487 B2 | * | 11/2009 | Brown ................. F16L 3/24 248/65 |
| 7,661,631 B2 | * | 2/2010 | Ibaraki ................. F16L 3/1075 248/68.1 |
| 7,836,565 B2 | * | 11/2010 | Ho ................. G06F 1/1601 24/528 |
| 8,013,248 B2 | * | 9/2011 | Sakata ................. H02G 3/04 174/68.1 |
| 8,141,826 B1 | * | 3/2012 | Gallardo ............... F16L 3/1091 24/16 R |
| 9,718,591 B2 | * | 8/2017 | Lu ................. B65D 63/1027 |
| 10,196,013 B2 | * | 2/2019 | Pantino ................. F16L 3/12 |
| 10,920,808 B2 | * | 2/2021 | Aoyama ................. H01F 17/06 |

| | | | |
|---|---|---|---|
| 2002/0063189 A1 | | 5/2002 | Coudrais |
| 2003/0000555 A1 | | 1/2003 | Nagayasu |
| 2007/0257159 A1 | | 11/2007 | Nelson et al. |
| 2008/0229550 A1 | * | 9/2008 | Elsner ................. B60R 16/0215 24/16 PB |
| 2009/0250559 A1 | * | 10/2009 | Benoit ................. F16L 3/00 248/49 |
| 2010/0186197 A1 | * | 7/2010 | Inomata ............. B60R 16/0215 24/16 R |
| 2010/0243855 A1 | * | 9/2010 | Sampson ................. F16L 3/123 248/534 |
| 2010/0270439 A1 | * | 10/2010 | Li ................. F16L 3/1075 248/65 |
| 2011/0180320 A1 | * | 7/2011 | Thomas ............. B60R 16/0215 174/70 R |
| 2012/0049011 A1 | * | 3/2012 | Liu ................. H02G 3/32 248/68.1 |
| 2012/0091290 A1 | * | 4/2012 | Shitamichi ........... H02G 3/0487 248/65 |
| 2012/0097804 A1 | * | 4/2012 | Liu ................. H02G 3/26 248/68.1 |
| 2013/0160246 A1 | * | 6/2013 | Hajduch ................. B65D 63/00 24/16 PB |
| 2013/0291358 A1 | * | 11/2013 | Hebda ................. H02G 3/30 29/407.02 |
| 2014/0217244 A1 | * | 8/2014 | Shiga ................. B60R 16/0215 248/49 |
| 2015/0136479 A1 | * | 5/2015 | Oga ................. B60R 16/0215 174/72 A |
| 2016/0114743 A1 | * | 4/2016 | Miyamoto ............ F16L 3/1075 224/557 |
| 2017/0110864 A1 | * | 4/2017 | Akahane ................. H02G 3/32 |
| 2017/0133827 A1 | * | 5/2017 | Sugino ................. B60R 16/0215 |
| 2017/0267191 A1 | * | 9/2017 | Chambosse ......... B60R 16/0215 |
| 2018/0022289 A1 | * | 1/2018 | Ishida ................. B60R 11/00 24/453 |
| 2018/0072248 A1 | * | 3/2018 | Ohashi ................. B60R 16/0215 |
| 2018/0128299 A1 | * | 5/2018 | Katabira ................. F16B 13/0833 |
| 2018/0175596 A1 | * | 6/2018 | Sugino ................. B60R 16/0215 |
| 2018/0294629 A1 | * | 10/2018 | Volpone ................. H02G 15/113 |

* cited by examiner

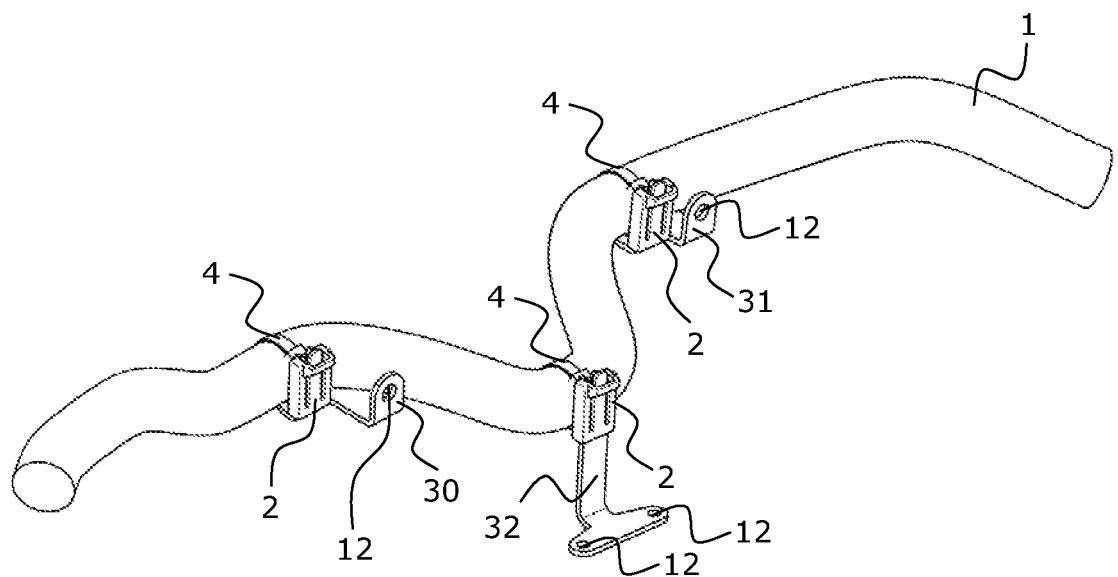
Fig. 4
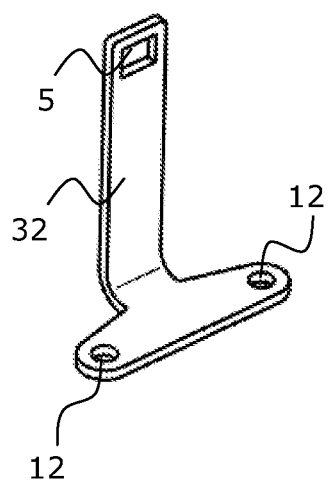 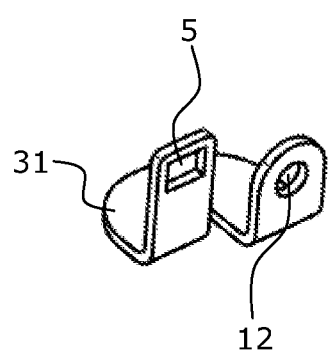
Fig. 5A     Fig. 5B

ARRANGEMENT FOR FASTENING AN ELONGATED OBJECT IN A MOTOR VEHICLE

This application claims the benefit of priority from European Patent Application No. 14 306 744.5, filed on Oct. 30, 2014, the entirety of which is incorporated by reference.

BACKGROUND

Field of the Invention

The invention relates to an arrangement for fastening at least one elongated object in a motor vehicle, wherein by means of a fastening means a fastening element is mounted on the motor vehicle and the elongated object is connected to at least one fixed point.

Description of Related Art

A plurality of different types of conductors is used in a motor vehicle. For example, the electrical elements or devices must be supplied with electrical energy. Among the electrical elements are, for example, light diodes in vehicle lamps and back lights, motors to raise and lower the windows, as well as movement of the rear view mirror, lighting the dashboard, sensors and control elements. Other systems, for example, the windshield wipers, must be supplied with liquids. The electrical elements are in a known way, by means of electrical conductors, often bound together in cable trees or cable sets, connected in the chassis to a central control arrangement. The cable sets can also contain signal conductors. Liquids can be transported by means of flexible or rigid lines.

The term an elongated object in a motor vehicle refers in the following to an electric cable tree or a fluid transport line.

The described conductors are placed within the motor vehicle and are fastened by means of support or fastening elements at certain fixed points to the vehicle body or components. In the engine cavity, the conductors are, for example, fastened to the motor and other components and extend above the same. In the mounting position, the conductors cover therefore different components, for example, filters. When repair and maintenance work has to be performed, for example, changing a filter, the conductor strands must be separated from their supports and must be bent from their position to such an extent that the elements to be processed or worked on become accessible. The support elements used comprise, for example, edge clips to which the lines are fastened by means of cable binders or similar fastening means. When the conductors come out of their supports, tools must be used and the edge clips can be damaged.

OBJECTS AND SUMMARY

It is the object of the invention to provide an arrangement for fastening of at least one elongated object in a motor vehicle which makes possible the releasable mounting of the elongated object at a fixed point, so that the elongated object can be fixed without tools as often as desired to the fixed point, and can be released again from the fixed point.

In accordance with the invention, this object is met in that the fastening element is releasably connectable to a receiving element which is fixedly attached to the fixed point.

The arrangement according to the invention permits the releasable fastening of the elongated object to a fixed point. The object can, in the case that the component underneath has to be repaired or must be exchanged, be simply and without tools bent aside and removed from the fixed point. The elongated object is by means of the fastening means permanently fastened to the fastening element and can be bent aside together therewith. After the work has been carried out, the elongated object can once again be brought into the mounting position and by means of the fastening element fastened on the fixed point. The fastening element or the receiving element is not damaged during separation or connection.

BRIEF DESCRIPTION OF THE DRAWINGS

Embodiments of the invention are illustrated in the drawings. In the drawings:

FIG. 4 shows in a perspective view three arrangements according to the invention in different embodiments attached with an elongated object, FIG. 5A shows an embodiment of a receiving element of the arrangement according to the invention, and FIG. 5B shows a further embodiment of an arrangement according to the invention of a receiving element.

DETAILED DESCRIPTION

Figure 1:
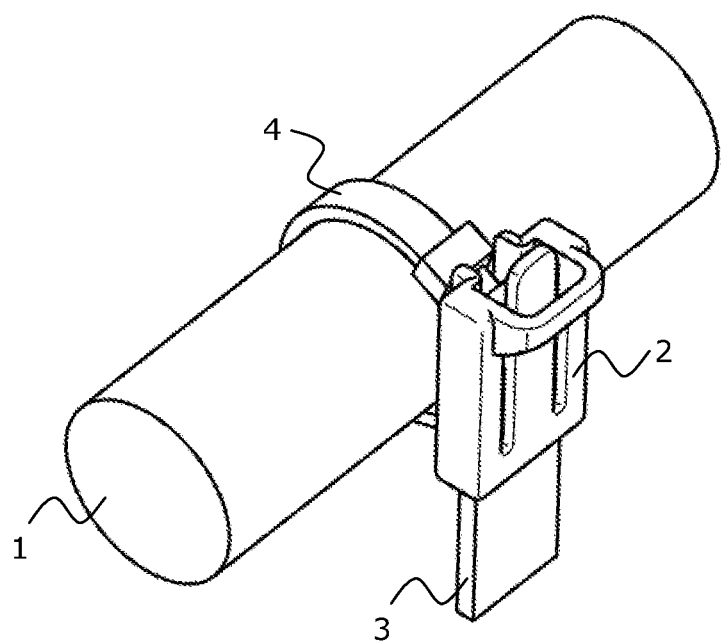
FIG. 1 shows in a perspective view an embodiment of the arrangement of the invention with a fastened elongated object.

In the drawings equal reference numbers refer to the same technical features.

FIG. 1 shows the arrangement according to the invention with attached elongated object 1 according to a first embodiment. The elongated object is, for example, a fluid transport line or an electric cable strand. In the following the term "conductor" is to be used for short.

The arrangement comprises a fastening element 2, on which the conductor 1 is fastened by means of a fastening means 4 and a receiving element 3. The fastening means 4 is, for example, a cable clip. The fastening element 2 with the attached conductor is fastened to the receiving element 3. The two elements 2, 3 engage each other through a locking mechanism.

Figures 2, 3A, 3B:
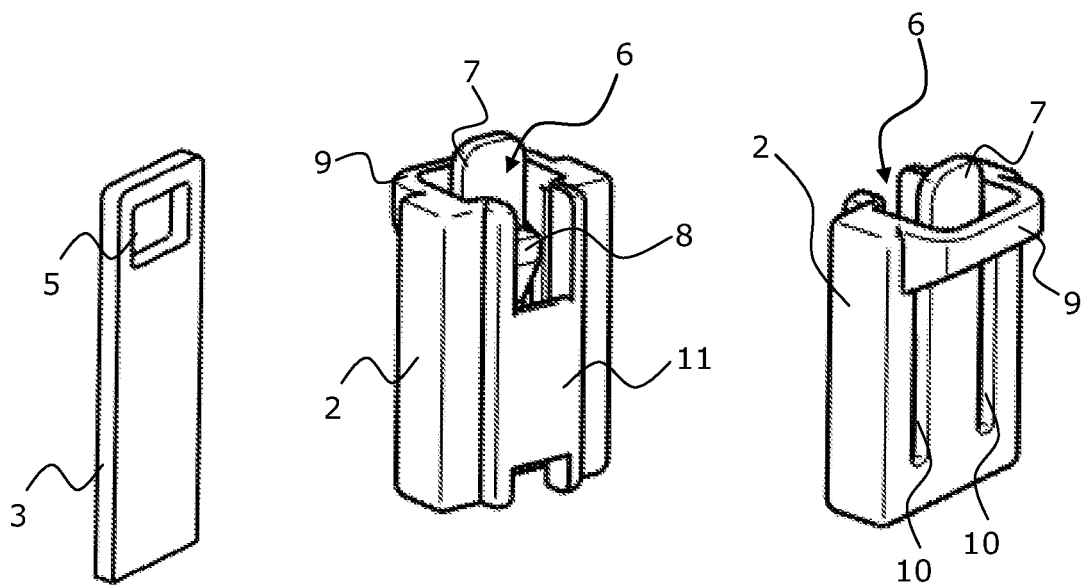
FIG. 2 shows in a perspective view an embodiment of the arrangement of the invention of a receiving element.
FIG. 3A shows in a perspective view an embodiment of the arrangement of the invention of a fastening element.
FIG. 3B shows another view of the fastening element in 3A.

FIG. 2 shows the receiving element 3 according to the arrangement of the invention in a single view. It is an elongated element, which has an opening 5. The opening 5 is part of the locking mechanism between the receiving element 3 and the fastening means 4. The receiving means 3 consists, for example, of metal. The receiving element 3 is a fixed point on the motor vehicle, for example, on the motor or other components in the engine compartment, or fixed on the chassis itself. It can be screwed on for example. The receiving element 3 acts as a support for the conductor 1.

In FIGS. 3A and 3B the fastening means 2 of the arrangement in FIG. 1 is illustrated in two individual views. The fastening means has a block shaped hollow form. With the continuous opening 6, the fastening means 2 can be placed on the receiving element 3. The fastening means 2 has as part of the locking mechanism, an unlocking lever 7 with a locking wedge 8. In the illustrated embodiment, the unlocking lever 7 has two slots 10 in a wall of the fastening means 2. Therefore, the fastening means 2 must be composed of a bendable material, for example, a synthetic material.

To fasten the line to the conductor 1 by means of the arrangement according to the invention, the fastening element 2 is fastened by means of the fastening means, for example, the cable clips. The connection is permanent. Subsequently, the fastening element 2 is placed on the receiving element 3. The locking wedge 8 of the fastening element 2 engages in the opening 5 of the receiving element 3 in the mounting position. Thus, the fastening and receiving elements 2, 3 are releasably connected with each other, and the fastening element 2 as well as the receiving element 3 are secured on the fixed point. To loosen and distance the fastening element 2, the unlocking lever 7 of the fastening element 2 is bent away, so that the locking wedge 8 is moved out of the opening 5 of the receiving element 3. The conductor 1 remains connected with the fastening element 2 and together they can be bent away. After the exchange or repair has been done on the components covered by the conductor 1, the conductor 1 can be brought back to the mounting position and by means of the fastening element 2 and the receiving element 3 is fastened on the fixed point.

As can be especially well recognized in FIG. 3B, the fastening element 2 in the illustrated embodiment has a safety stirrup 9 which prevents the locking lever 7 from being bent too far away from its position of rest and damaged.

Referring particularly to FIG. 3A, the fastening element 2 additionally has in its wall, located opposite of the unlocking lever 7, a device 11 for mounting the fastening means. In the illustrated embodiment, the device is a receiving means 11 for a cable binder. The cable binder can be introduced from above or below in the receiving means 11. Consequently, the fastening element 2 can always be fastened to a conductor 1.

In accordance with another embodiment which is not illustrated, the fastening means can also comprise a connecting tether which is a part of the fastening element 2. The connecting tether can then, for example, be fastened to the conductor 1 by means of an adhesive tape.

FIG. 4 shows a conductor 1 with three arrangements according to the invention attached thereto in different configurations. The conductor 1 can, for example, be loosely fastened in the engine compartment of a motor vehicle. The three arrangements according to the invention are comprised respectively out of a fastening element 2, a cable binder 4 and a receiving element 30, 31, 32.

The receiving elements 30, 31, 32 are each selected in such a way that they are adapted to the specific configurations of the placement locations, for example, in the engine compartment of the motor vehicle. For example, the two outer compact receiving elements 30, 31 may have the purpose of fastening the conductor 1 to a structural component in the engine compartment. The central longer receiving element 32 is, for example, suitable for securing the conductor 1 directly at the chassis motor vehicle body. FIGS. 5A and 5B show the receiving elements 30, 31 on a larger scale. The receiving elements 30, 31, 32 each have one or more bores 12, each of which can be screwed on a respective fixed point, for example. The receiving elements can include additional functions, for example, as supports for other elements or components in the engine compartment.

The invention claimed is:

1. An arrangement for fastening at least one elongated object in a motor vehicle in a form of a releasable locking mechanism, said releasable locking mechanism comprising:
   a plurality of receiving elements, each fastened, in a different mounting position, to different fixed points of said motor vehicle, each of said receiving elements having an opening;
   a plurality of fastening means, each configured to surround and couple with said at least one elongated object at a respective location associated with one of said different mounting positions of said receiving elements at said fixed points of said motor vehicle;
   each of said fastening means having a fastening element that is configured to be releasably connected to one of said receiving elements, said fastening element securing said receiving element to said fastening means and said elongated object,
   wherein the fastening element, is constructed of a bendable material, has an elongated opening running a length of said fastening element for receiving said receiving element therein, said fastening element also having an unlocking lever, a locking wedge on said unlocking lever, and a safety stirrup,
   said unlocking lever being formed as a bendable tab on one side of said fastening element between two cut away slots connected to a body of said fastening element at one side and extending up to another side of said fastening element and terminating in a free and at a location of said safety stirrup, said unlocking lever being capable of being bent aside within a confines of said safety stirrup,
   wherein in a mounting position said receiving element, at a fixed location on said motor vehicle, is fit with said elongated opening until said opening in said receiving element is connected with said locking wedge on said unlocking lever, such that said locking wedge of said unlocking lever engages in said opening of the receiving element and secures said receiving element to said fastening means and said elongated object,
   wherein in a releasing position, a free end of said unlocking lever is configured to be bent aside from the receiving element, without tools, until said free end of said unlocking lever contacts said safety stirrup, such that the locking wedge on said unlocking lever is moved out of the opening of the receiving element releasing said fastening element from said receiving element; and
   wherein said safety stirrup is elongated in a horizontal direction and further comprises an upper surface that is flush with an upper surface of said fastening element and a lower surface that tapers towards a side of the fastening element.

2. The arrangement according to claim 1, wherein the elongated object is an electric cable tree or a fluid transport line.

3. The arrangement according to claim 1, wherein said arrangement is a fastening arrangement within an engine compartment of a motor vehicle.

* * * * *